No. 753,761. PATENTED MAR. 1, 1904.
C. E. TORRANCE.
CALENDERING MACHINE.
APPLICATION FILED AUG. 30, 1902.
NO MODEL. 10 SHEETS—SHEET 2.

WITNESSES:

INVENTOR:
Charles E. Torrance
by Wright, Brown & Quinby
Attys.

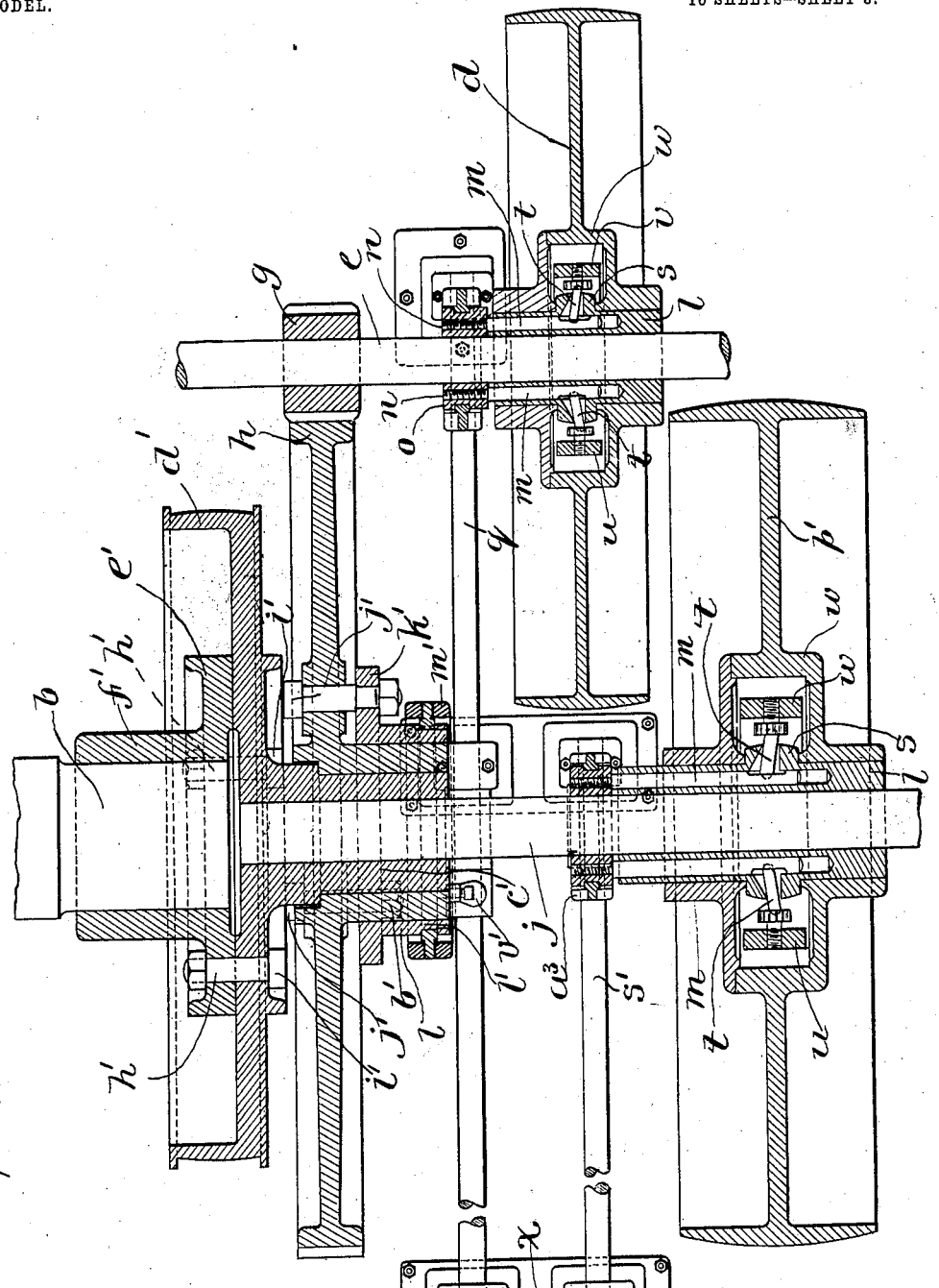

No. 753,761. PATENTED MAR. 1, 1904.
C. E. TORRANCE.
CALENDERING MACHINE.
APPLICATION FILED AUG. 30, 1902.
NO MODEL. 10 SHEETS—SHEET 4.
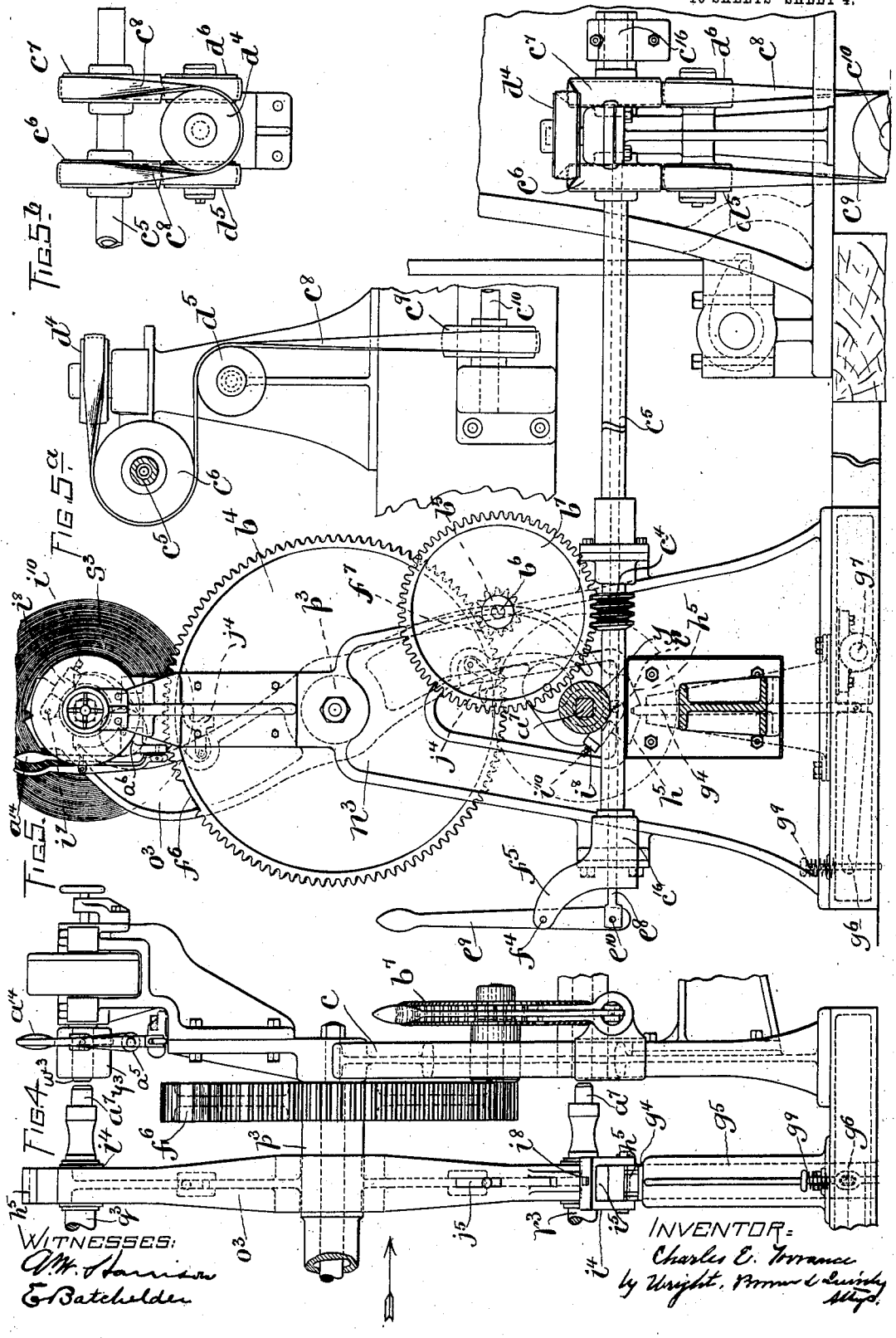
WITNESSES:
INVENTOR:
Charles E. Torrance
by Wright, Brown & Quinby
Attys

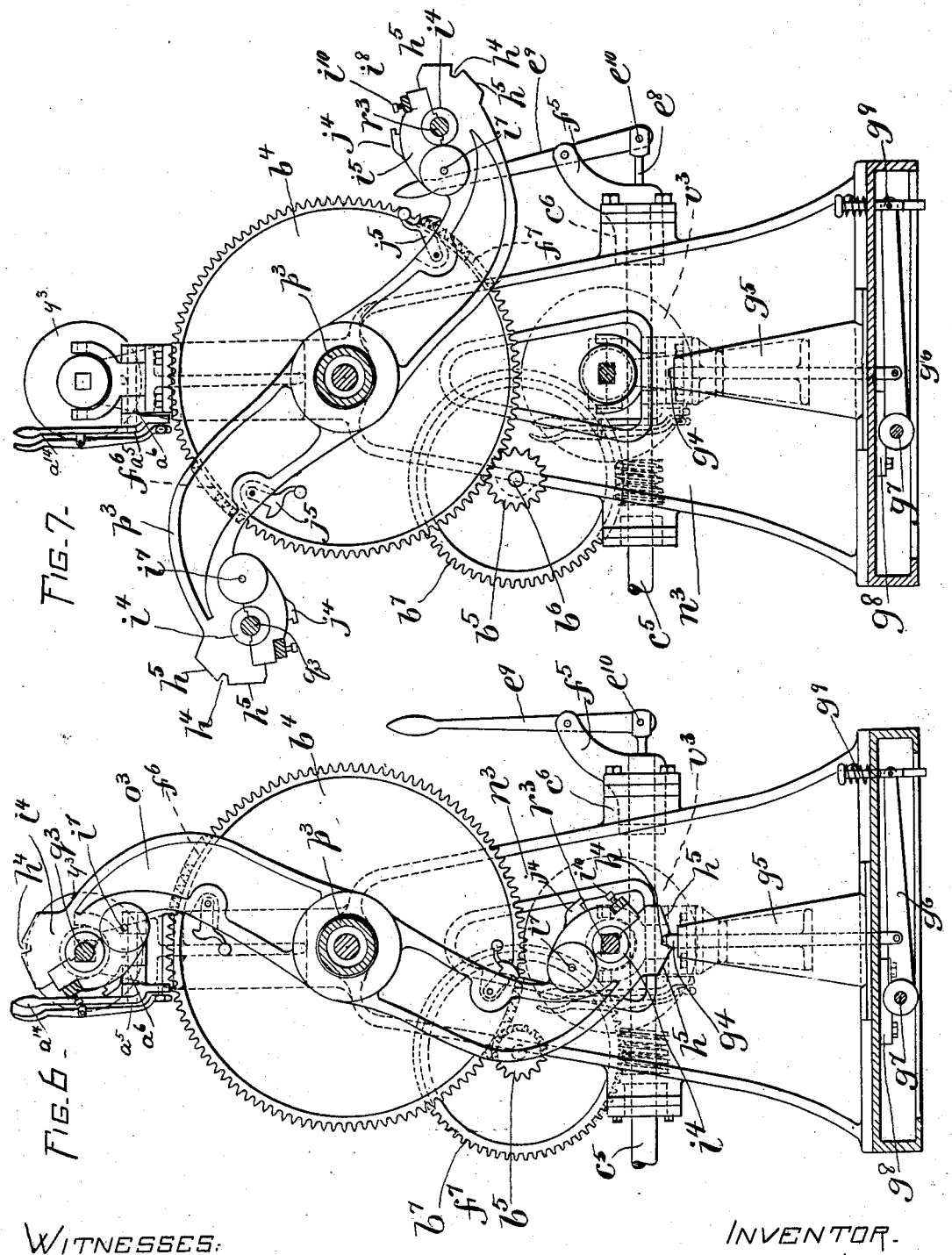

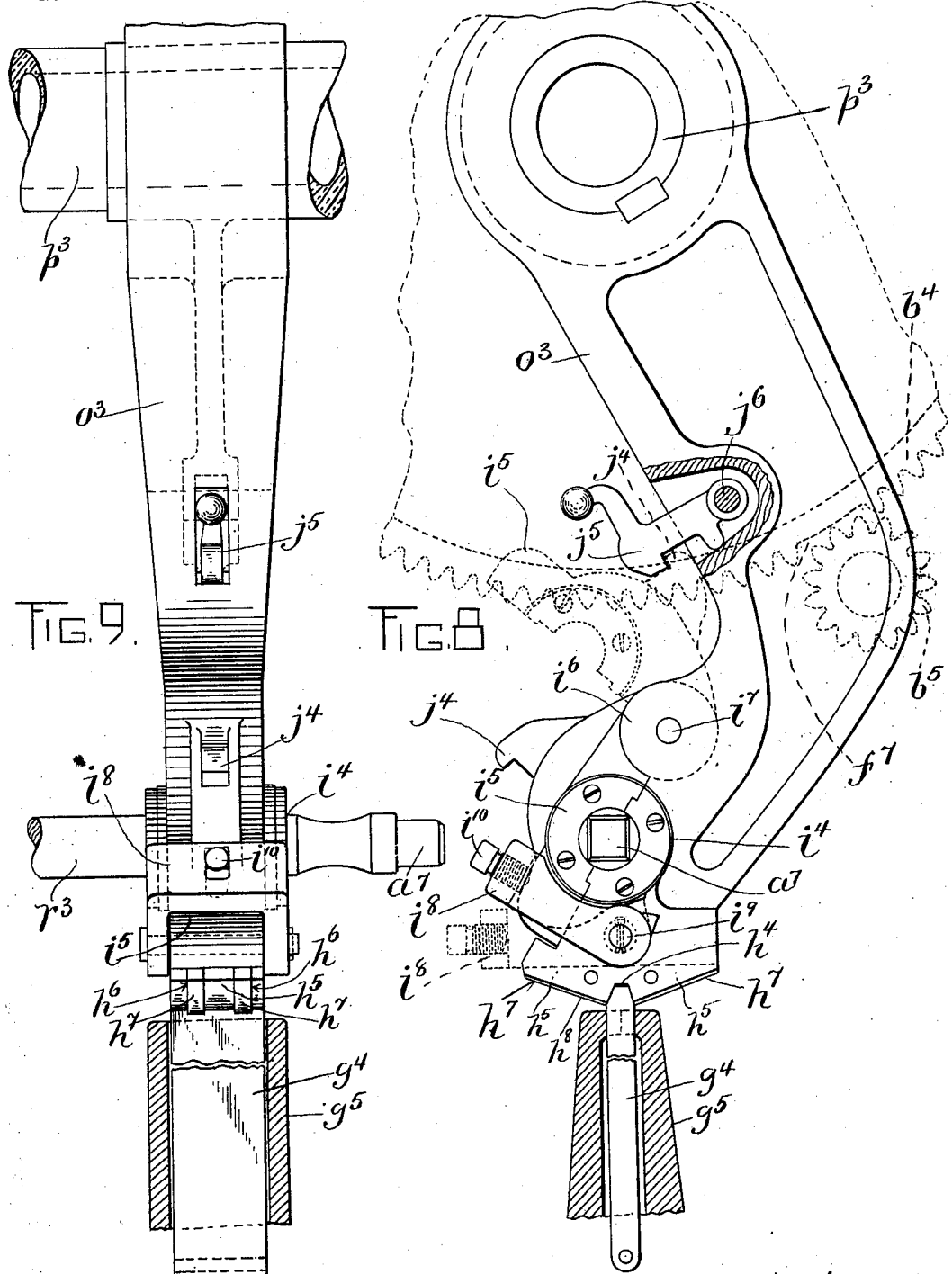

No. 753,761. PATENTED MAR. 1, 1904.
C. E. TORRANCE.
CALENDERING MACHINE.
APPLICATION FILED AUG. 30, 1902.
NO MODEL. 10 SHEETS—SHEET 7.
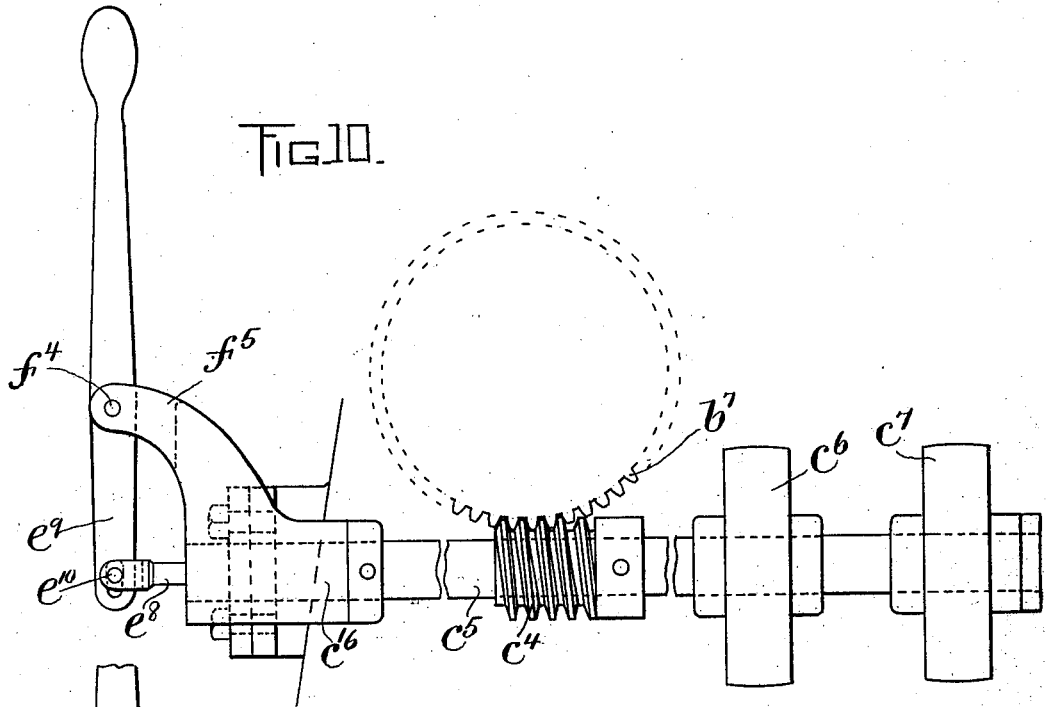
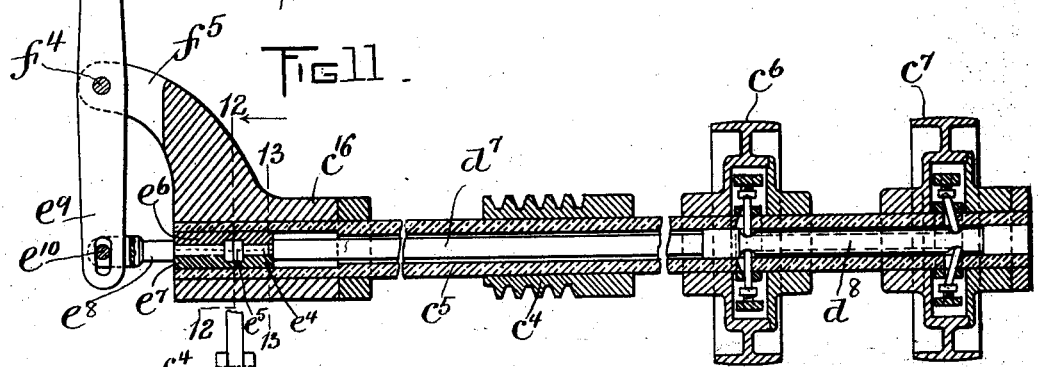
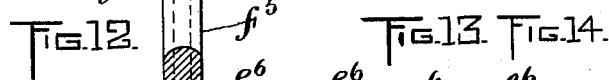
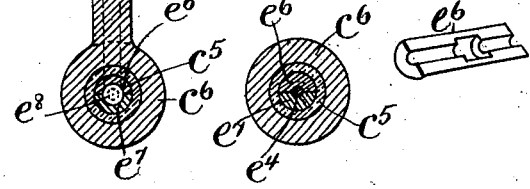
WITNESSES.
INVENTOR.

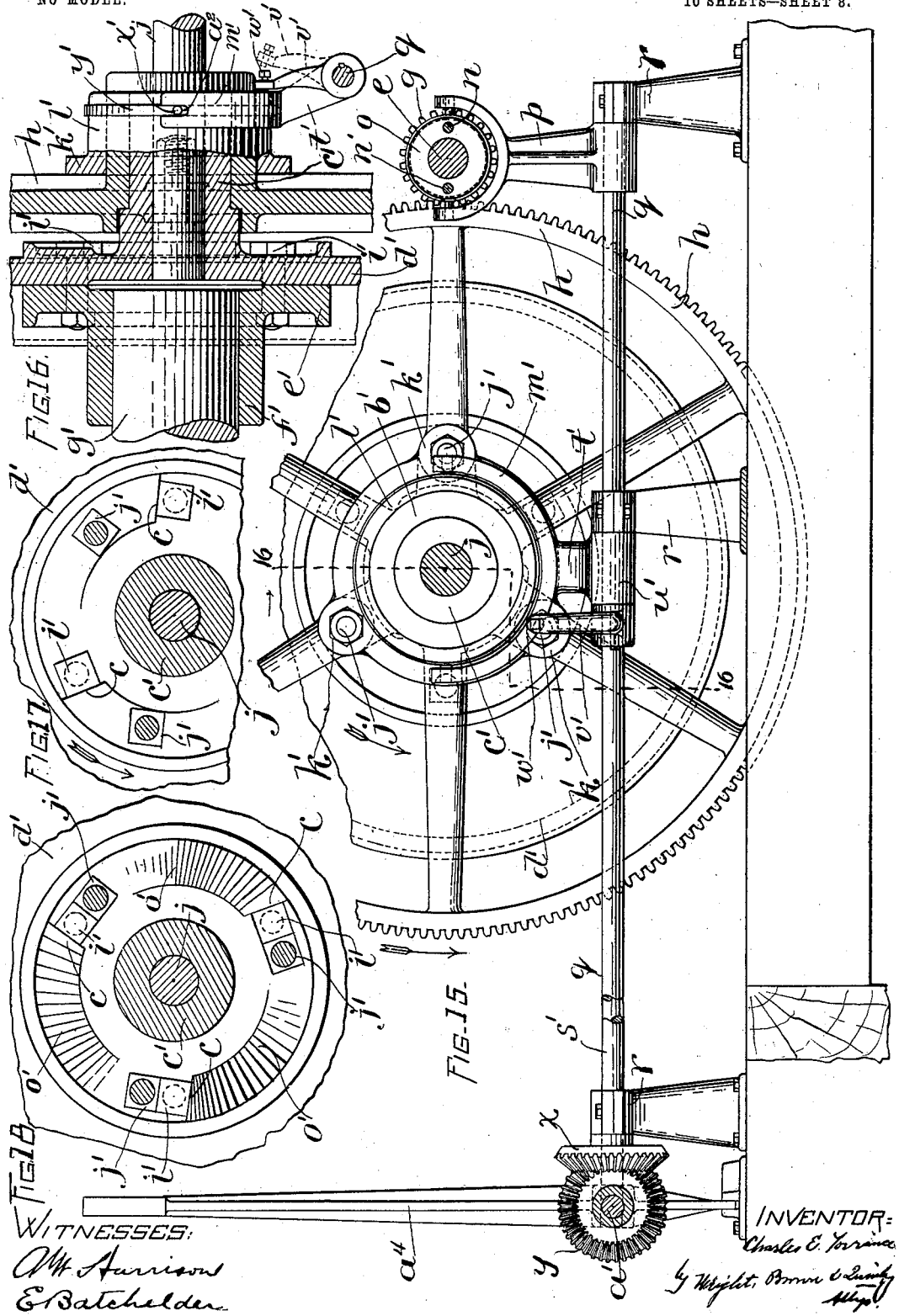

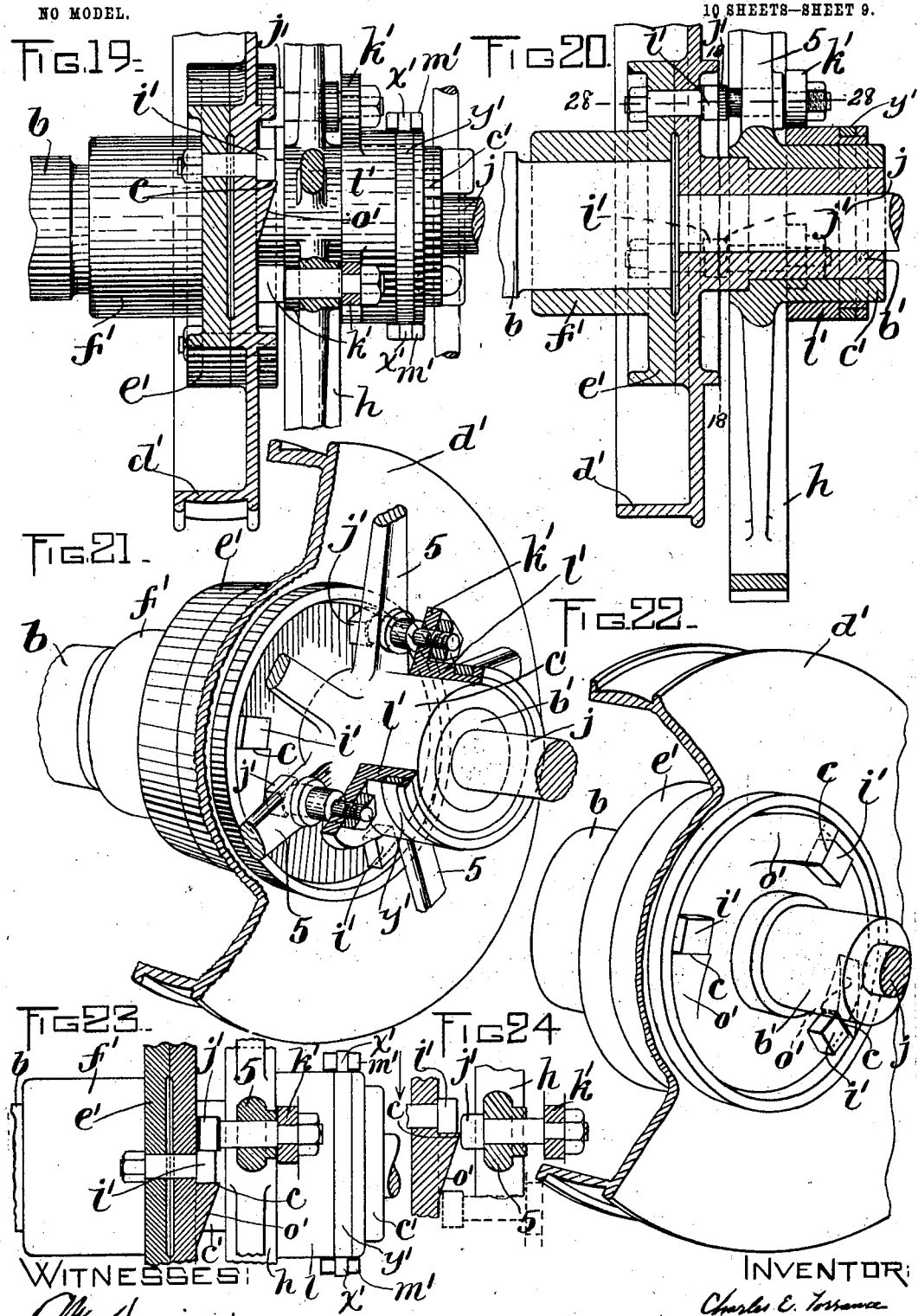

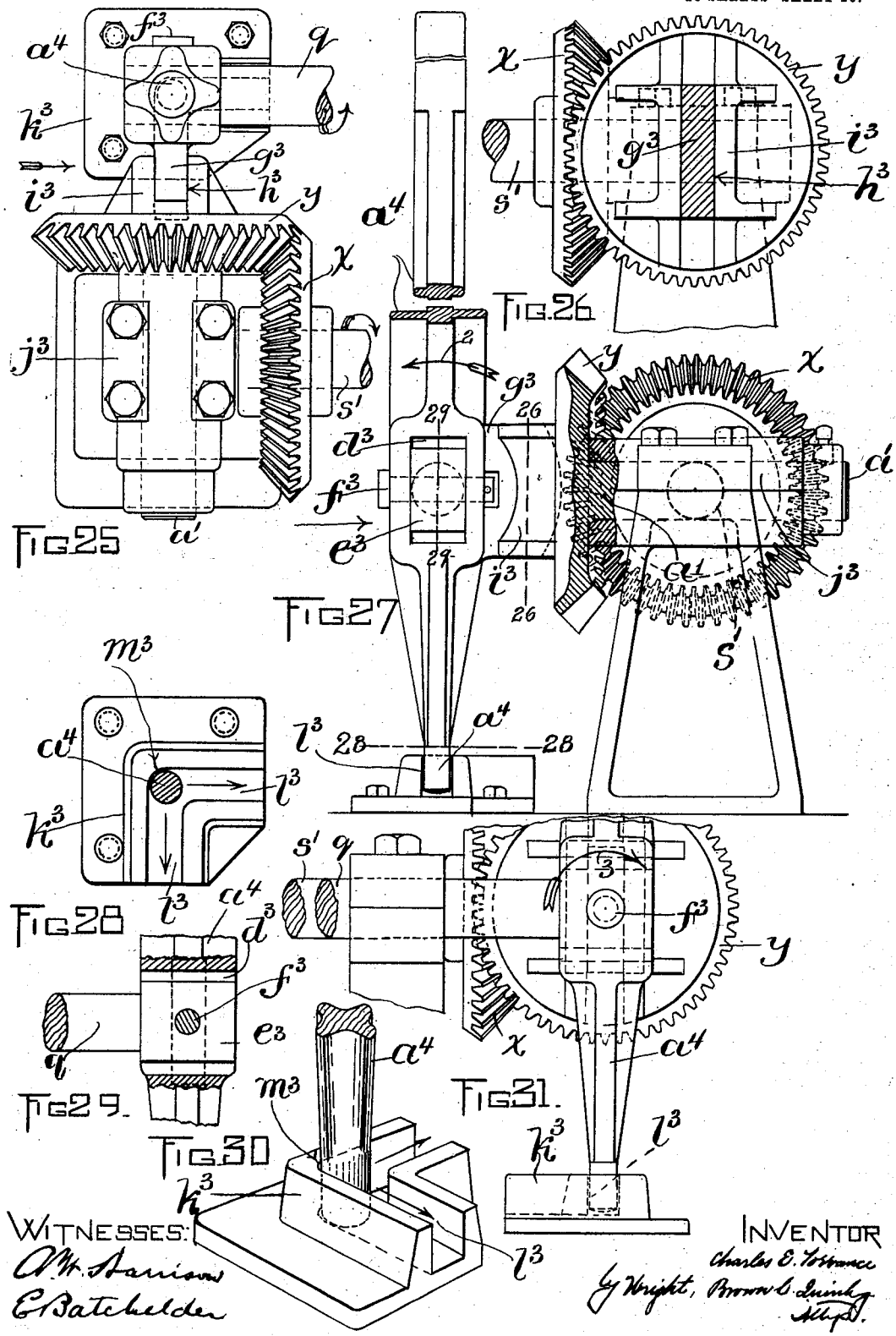

No. 753,761.   Patented March 1, 1904.

UNITED STATES PATENT OFFICE.

CHARLES E. TORRANCE, OF NORTHAMPTON, MASSACHUSETTS.

CALENDERING-MACHINE.

SPECIFICATION forming part of Letters Patent No. 753,761, dated March 1, 1904.

Application filed August 30, 1902. Serial No. 121,575. (No model.)

*To all whom it may concern:*

Be it known that I, CHARLES E. TORRANCE, of Northampton, in the county of Hampshire and State of Massachusetts, have invented certain new and useful Improvements in Calendering-Machines, of which the following is a specification.

This invention relates to machines for calendering paper, commonly known as "supercalendering-machines," and it has for its object to provide improved means for operating the same.

The invention consists in the arrangement of driving mechanism by means of which the rotation of the calender-rolls is increased or diminished, improved means for locating the rolls of paper preparatory to presenting the paper to the calender-rolls, and means for removing the same from the paper-roll carrier, all of which I will now proceed to describe and claim.

Figure 1:
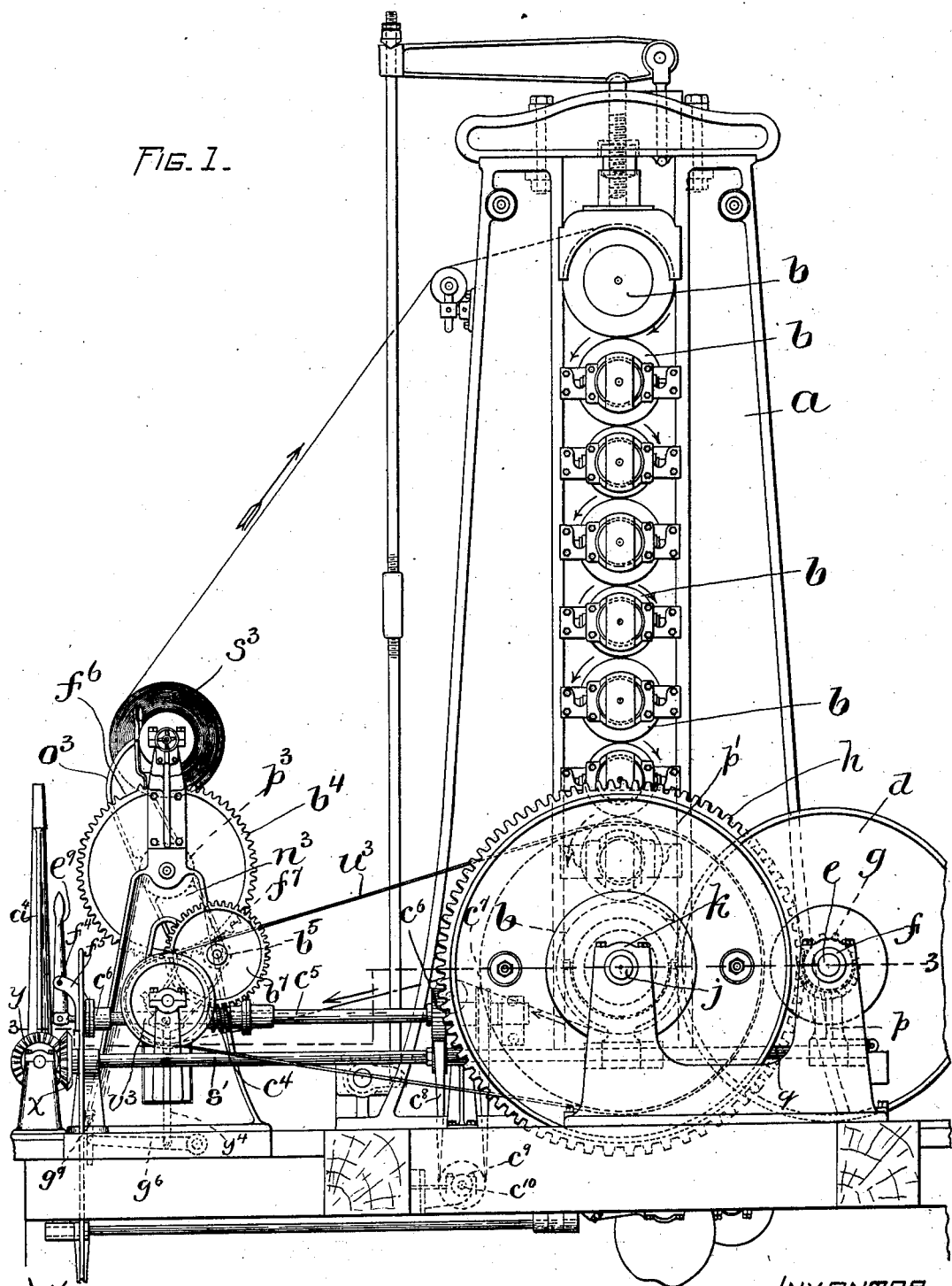
Figure 2:
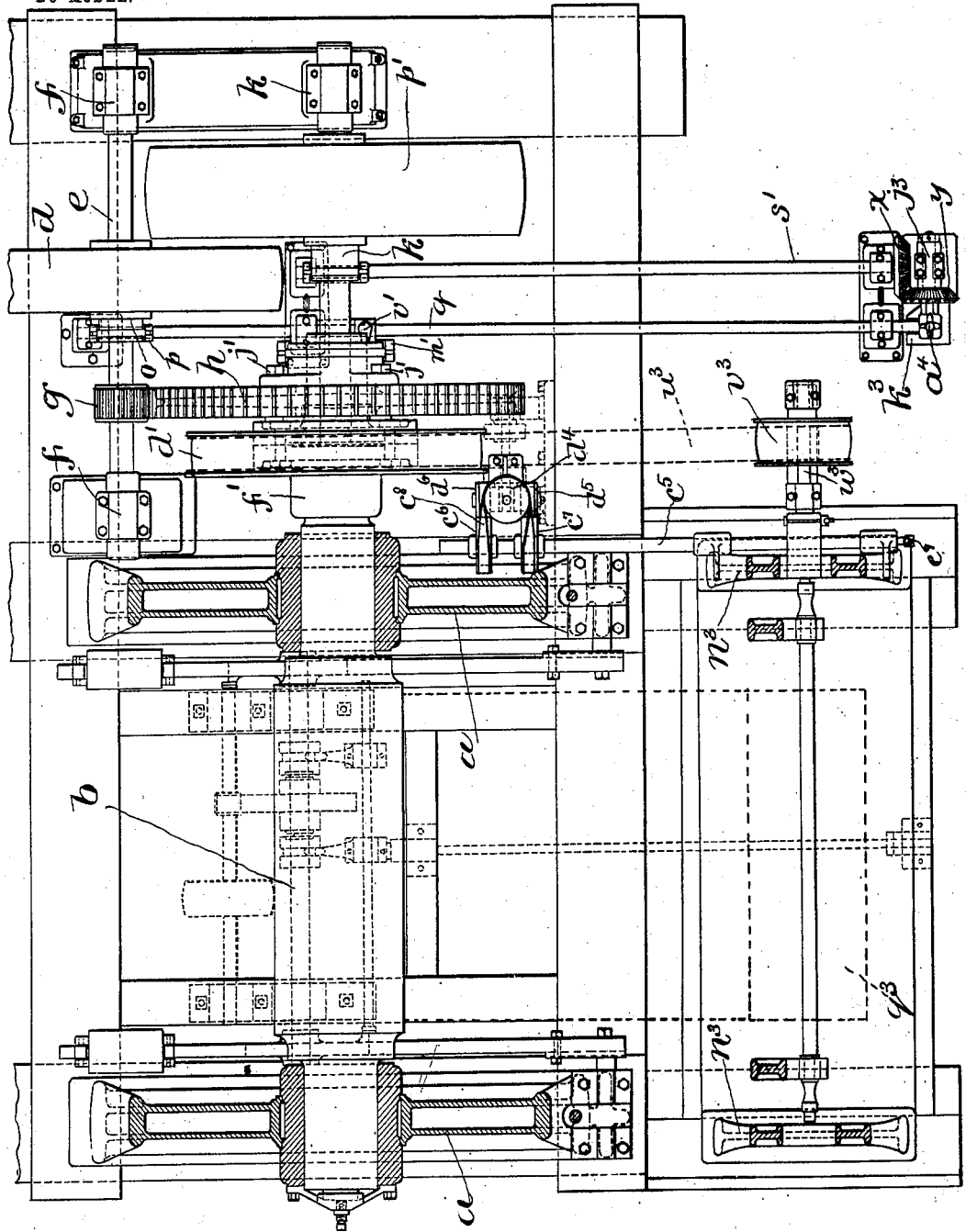

Of the accompanying drawings, forming a part of this specification, Figure 1 represents an end elevation of a calendering-machine embodying my improvements. Fig. 2 represents a plan of the operating mechanism, the upper portion of the roll-supporting frame being removed. Fig. 3 represents a horizontal section on the line 3 3 of Fig. 1 of the driving mechanism and means for operating the same. Fig. 4 represents an enlarged front elevation of a part of the paper-roll carrier and operating mechanism. Fig. 5 represents an end view of the same. Figs. 5$^a$ and 5$^b$ are respectively a detail side elevation and top view of a part of the mechanism for rotating the roll-carrier. Figs. 6 and 7 represent side elevations of the roll-carrier arm in different positions looking from the opposite side of Fig. 5 or in the direction of the arrow in Fig. 4. Fig. 8 represents an enlarged portion of the roll-carrier arm, the gear and pinion which drives the same being shown in dotted lines. Fig. 9 represents a front view of the same. Figs. 10 and 11 represent detail views of the roll-carrier-operating mechanism hereinafter described. Fig. 12 represents a section on the line 12 12, Fig. 11. Fig. 13 represents a section on line 13 13, Fig. 11, looking in the direction of the arrow in Fig. 11. Fig. 14 represents a perspective detail hereinafter described. Fig. 15 represents a detail elevation, somewhat enlarged, looking from the right of Fig. 2. Fig. 16 represents a section on line 16 16 of Fig. 15. Figs. 17 and 18 represent detail views of some of the parts on the line 18 18 of Fig. 20, the parts being shown in different positions in the two figures. Fig. 19 represents a detail plan view, partly in section, of the parts shown in Figs. 16 to 18. Fig. 20 represents a detail sectional view of the same parts. Fig. 21 represents a perspective view with parts broken away, showing the low-speed mechanism in inoperative position. Fig. 22 represents a similar view with the parts of the low-speed mechanism removed. Figs. 23 and 24 represent minor detail sectional views of some of the parts shown in the other figures on the same sheet. Fig. 25 represents an enlarged plan view of the shaft-operating means illustrated more completely in Fig. 2. Fig. 26 represents a section on line 26 26 of Fig. 27. Fig. 27 represents an elevation looking in the direction of the arrow in Fig. 25. Fig. 28 represents a section on the line 28 28 of Fig. 27 looking downwardly. Fig. 29 represents a section on the line 29 29 of Fig. 27. Fig. 30 represents a perspective view of the lower end of the operating-lever and of the guide therefor. Fig. 31 represents a detail side elevation looking in the direction of the arrow in Fig. 27.

The same reference characters indicate the same parts in all the figures.

In the drawings, $a$ represents the supporting-frame, and $b$ the calender-rolls, the construction and arrangement of which are common and well known.

$n^3$ represents the supporting-frame of the paper-roll carrier and its operating mechanism.

The rolls $b$ are driven at high and low speed at the will of the operator, the low speed being preferable for introducing the paper to and between the rolls and the high speed for the calendering operation. The low-speed mechanism consists of a driving-pulley $d$, mounted upon a shaft $e$, journaled in bearings $f$ on the frame $a$. (See Figs. 1, 2, and 3.) To the shaft $e$ is secured a pinion $g$, meshing with a gear $h$ on a shaft $j$, journaled in bearings $k$ on the frame $a$. The low-speed pulley $d$ is provided with a suitable clutch, Fig. 3, for the intermittent operation of the shaft $e$, and I prefer to use the well-known Wheaton type, as in Patent No. 691,221, although I may use any other suitable form. Said clutch consists of a sleeve $l$, which is rigidly secured to the shaft $e$ and is bored to receive two rods $m$, the outer ends $n$ of which are connected to a collar $o$, adapted to be operated longitudinally of the shaft by an arm $p$, connected at its lower end to a rod $q$, journaled in bearings $r$. (See Figs. 3 and 15.) The sleeve $l$ is provided with a hub $s$, having suitable openings, in which are struts $t$, the outer ends of which are adapted to engage the clutch members $u$ $v$ and force the latter outwardly into engagement with the inner periphery of the hub $w$ of the pulley $d$.

The clutch-operating rod $q$, Fig. 15, is operated by a lever or handle $a^4$, which is arranged to operate the said rod $q$ and shaft $s'$ separately. The construction and arrangement of the operating mechanism of the shipping-shafts $q$ and $s'$ will be more fully explained hereinafter.

The gear $h$ is provided with a hub $b'$, loosely engaging a hub $c'$ of a pulley $d'$, to which pulley, upon its inner side, is secured an annular flange $e'$, having a hub $f'$ rigidly secured to the lower calender-roll $b$. The flange $e'$ is secured to the pulley $d$ by bolts $h'$, having square heads $i''$, (preferably hardened,) adapted to be engaged by complemental bolts $j''$, (see Figs. 1 and 19 to 24,) mounted loosely in the arms 5 of the gear $h$, the outer ends of said bolts engaging lugs $k'$, formed on a hub $l'$, adapted to be engaged by a shipping-fork $m'$, secured to and operated by the rod $q$, so that the bolt-heads $j''$, carried by the gear $h$, may engage the bolt-heads $i''$, carried by the hub or flanged collar $f'$ and pulley $d'$, and cause the latter to rotate the calender-rolls at low speed.

In Fig. 18 are shown the bolt-heads $j''$ $i''$ in engagement, the heads $i''$ being shown as carried by the pulley $d'$, while the bolts $j''$ are shown in section on the line 18 18 of Fig. 20 as carried by the gear $h$. To prevent springing of the bolts $i''$ by the strain of impact of the bolts $j''$ therewith, I have formed upon the face of pulley $d'$ bearings or abutments $c$ for said bolt-heads to bear against, said abutments having also an inclined face $o'$, for a purpose to be presently explained. The position of the bolt-heads when engaged is most clearly shown in Figs. 19 and 23.

The description thus far relates to the mechanism for imparting low-speed movement to the machine. The change from low to high speed will be next described.

Referring more directly to Figs. 1, 2, and 3, $p'$ represents a driving-pulley having a clutch mechanism similar to that hereinbefore described and adapted to operatively connect said pulley to the shaft $j$. A shipping-collar or fork $a^3$ is arranged to connect the pulley with the shaft, said collar being operated by a shipping-rod $s'$, journaled in suitable bearings and having at its outer end a bevel-gear $x$, meshing with a bevel-gear $y$ on a shaft $a'$, journaled in suitable bearings and adapted to be operated by the handle $a^4$ in a manner hereinafter described.

It will be seen that when the pulley $p'$ is brought into operative connection with the shaft $j$ the speed of the latter will be increased and the low-speed mechanism becomes inoperative. It is of course understood that the shaft $j$ is rotated in the same direction by both low and high speed mechanisms, the low speed being usually employed when, as before stated, the paper is being passed through the rolls by the operator, after which the high-speed pulley $p'$ is engaged with the shaft $j$ and the low-speed clutch is automatically released by the following means: Referring to Figs. 15 and 16, $m'$ represents a shipping fork or yoke having an arm $t'$ formed thereon. Said arm has a sleeve $u'$, adapted to receive the shaft $q$, said shaft fitting loosely in said sleeve. $v'$ represents an arm keyed or otherwise secured to the shaft $q$, its free end being provided with an adjusting-stud $w'$, which bears against the outer surface of the shipper-fork $m'$. Said shipper-fork engages the flanged hub or collar $l'$ by means of a ring $y'$, said ring having trunnions which engage slots $a^2$ in the shipper-fork. When the flanged collar $l'$ is moved by the arm $t'$, so that the heads of the bolts $j''$, carried by the lugs $k'$, engage the heads of the bolts $i''$, carried by the face of the pulley $d'$ and the flanged collar $f'$, are brought into engagement, as shown in Figs. 18, 19, 20, and 23, the arm $v'$ is thrown back to its normal position, as shown in dotted lines in Fig. 16, and the bolt-heads $i''$ $j''$ remain in engagement through frictional contact created by the resistance of the driven rolls, the arrangement being such that the bolt-heads $j''$ are free to be disengaged from the bolts $i''$ when the high-speed pulley is engaged with the shaft by the following means:

$s'$ represents a shipper-rod journaled in suitable bearings and having upon its outer end a bevel-gear $x$, meshing with a bevel-gear $y$ on a shaft $a'$. The gears impart rocking movement to the shaft by means of the lever $a^4$ through a novel arrangement which will be more fully explained hereinafter. The opposite or inner end of the rod $s'$ is arranged to operate a shipping fork or yoke $a^3$, connected with a collar $b^3$ on the shaft $j$, which collar is connected with a clutch mechanism in the pulley $p'$ similar to that already described in connection with shaft $e$ and pulley $d$. When connection is made between the pulley $p'$ and the shaft $j$, the more rapid rotation of the shaft and its attached devices (pulley $d'$ and flanged collar $f'$) causes the bolt-heads $i''$ to separate from the bolt-heads $j''$ and brings the inclines $o'$ of the abutments $c$ into engagement with the bolt-heads $j'$, in the manner shown in dotted lines in Fig. 24, causing the bolt-heads $j'$ to recede to the position shown in full lines in the said figure, (and also shown in Fig. 17,) causing the collar $l'$ to be moved therewith, so that the shipper-fork $m'$, being loose on the shaft $q$, is returned automatically to the position first described and in readiness to again operate the low-speed mechanism.

Fig. 22 shows clearly the abutments $c$ and their relations to the bolt-heads $i'$.

By reference to Figs. 1, 2, and 3 it will be seen that the clutch-shaft-operating lever $a^4$ is adapted to operate shaft $q$ and shaft $s'$ to engage the low-speed pulley with the shaft $j$ and also to engage the high-speed pulley with said shaft. The lever $a^4$ is pivoted to the shaft $q$, Figs. 27 and 28, at its outer end. The lever is provided with a rectangular opening $d^3$, adapted to receive the end $e^3$ of the shaft $q$. The lever $a^4$ is secured to the shaft by a pin $f^3$, and is adapted to rock in one direction on the pin, as will be presently explained. The arm or lever $a^4$ is also provided with a tongue $g^3$, adapted to fit a groove $h^3$, formed in a projection $i^3$ upon the gear $y$. Said gear $y$ is provided with a shaft $a'$, preferably formed therewith and journaled in bearings $j^3$. The bottom end of lever $a^4$ is adapted to enter an angular groove $l^3$, formed in a casting $k^3$, suitably secured to the floor. The groove is formed coincident with the shaft $q$ and the gear-shaft $a'$, so that it permits the bottom end of the lever $a^4$ to be operated in two directions, as shown by the arrows in Figs. 28 and 30. The corner or intersection of the angles of the groove operates as a stop to the movement of the lower end of the lever $a^4$, so that it can only be moved in the two directions already indicated. The tongue $g^3$ is adapted to move freely in the groove $h^3$, so that when the lever $a^4$ is rocked in the direction of the arrow 2, Fig. 27, the shaft $q$ is rocked on its axis to operate the low-speed pulley, and when the lever is rocked in the direction of the arrow 3, Fig. 31, it causes the gear $y$ to rotate on its axis and impart motion to the gear $x$ and through the latter to the shaft $s'$.

The construction and operation of the devices for presenting the paper to the roll will be next described.

Referring to Figs. 1 to 9, inclusive, $n^3$ represents the supporting-frame of the paper-roll carrier. Said paper-roll carrier is composed of two arms $o^3$, mounted upon a central shaft $p^3$, journaled in suitable bearings on the supporting-frame $n^3$. $q^3$ and $r^3$ represent shafts detachably secured in bearings at the ends of the arms $o^3$. Either of said shafts $q^3$ $r^3$ is adapted to have mounted thereon a roll of paper $s^3$. In the present instance the shaft $q^3$ carries the roll of paper to be operated upon by the calenders. The paper is passed between the rolls in the direction of the arrows shown in Fig. 1 and is wound upon the shaft $r^3$, said shaft being rotated by a pulley $v^3$, mounted on a shaft $w^3$, journaled in bearings on the supporting-frame $n^3$, the pulley $v^3$ being driven by a belt $u^3$ from the pulley $d'$. The shaft $w^3$ is provided with a clutch $y^3$, adapted to engage the ends of the shafts $q^3$ and $r^3$ as the latter come opposite thereto. Said clutch is adapted to be moved longitudinally of the shaft $w^3$ by a lever $a^{14}$, pivoted at $a^5$ to a lug $a^6$, secured to the supporting-frame. The end $a^{17}$ of the shaft $m^3$ and the clutch mounted thereon are square in cross-section, which permits the latter to be moved longitudinally of the shaft and to rotate therewith. The shafts $q^3$ $r^3$ of the paper-roll carrier are also provided with squared-end portions $a^7$, so that when the clutch $y^3$ is engaged with the latter rotation is obtained.

I have provided means for rotating the roll-carrier and the roll of paper mounted thereon, so that when it is necessary to repeat the operation of calendering the same roll the position of said roll may be changed from the winding mechanism to the unwinding. To this end I have provided a gear $b^4$, mounted upon the shaft $p^3$ and meshing with a pinion $b^5$ on a shaft $b^6$, journaled in bearings on the frame $n^3$. On the shaft $b^6$ is mounted a worm-wheel $b^7$, meshing with a worm $c^4$, mounted on a shaft $c^5$, journaled in bearings $c^{16}$ $c^{16}$ on the frame of the machine. On the outer end of the shaft are mounted two pulleys $c^6$ $c^7$, driven by a belt $c^8$, operated by a pulley $c^9$, mounted on a driving-shaft $c^{10}$. The driving-belt $c^8$ is arranged to rotate pulleys $c^6$ $c^7$ in opposite directions by the use of idler-pulleys $d^4$ $d^5$ $d^6$, Figs. 5, 5$^a$, and 5$^b$, so that the rotation of the carrier may be controlled by the operator by the following means: It will be seen by reference to Fig. 11 that the worm-shaft $c^5$ is hollow, and the pulleys $c^6$ $c^7$ are mounted loosely thereon. Said pulleys are provided with suitable clutch mechanism, the well-known Wheaton type being preferred, as hereinbefore mentioned. The clutch-operating mechanism is contained in the interior of shaft $c^5$ and consists of a rod $d^7$, having an enlarged portion $d^8$, adapted to fit the bore of the shaft $c^5$ and be engaged by the clutch-operating devices. The inner end of the rod $d^7$ is provided with a reduced portion $e^4$, having a flange $e^5$ formed thereon, which is adapted to engage a coupling composed of two members $e^6$ $e^7$. Said coupling also engages a connecting-rod $e^8$, the outer end of which is connected with a lever $e^9$ by a pin $e^{10}$. The lever $e^9$ is pivoted at $f^4$ to an arm $f^5$, formed on the shaft-bearing $c^{16}$, and is adapted to enable the operator to readily connect either of the pulleys $c^6$ $c^7$ with the shaft $c^5$ at will to rotate the carrier-arm $a^3$ in either direction.

The gear $b^4$ is mutilated at diametrically opposite points, which provides blank spaces $f^6$ $f^7$, (see Figs. 6 and 7,) the position of which is coincident with the position of the carrier-arms when in operative position, so that the pinion is prevented from rotating the gear more than half a revolution, which is sufficient to bring the devices operated thereby to the proper position.

The carrier-arms are positively held in operative position by a dog $g^4$, supported by a guide $g^5$, secured to the bed of the machine, Figs. 6 and 7. Said dog is pivotally connected at its lower end to a lever $g^6$, pivoted at $g^7$ to a lug $g^8$, secured to the under side of the bed of the machine. The outer end of the lever $g^6$ is provided with a treadle-rod $g^9$, adapted to be depressed by the foot of the operator. The upper end of the dog engages notches $h^4$, formed in the end portions of the carrier-arms to hold the latter in operative position.

The ends of the carrier-arms are provided with inclined faces $h^5$, in which are formed grooves for the reception of hardened contact-pieces $h^7$. (See Figs. 8 and 9.) Said pieces project sufficiently to engage the dog $g^4$ and present a wearing-surface thereto which can be readily renewed when necessary. When the carrier-arms are to be rotated to change the roll of paper being operated upon, the dog $g^4$ is withdrawn from the notch $h^4$ and the operator rotates the arms on their axis until the teeth of gear $b^4$ engage the teeth of pinion $b^5$, which pinion continues the rotation until it engages the blank space $f^7$ on the periphery of gear $b^4$, just previous to which the inclined surface $h^5$ has engaged the dog $g^4$, and under the momentum acquired in the operation of rotation the dog is depressed until it registers with the notch $h^4$, with which it engages, and stops the arms, as most clearly shown in Fig. 8.

In Fig. 8 I have shown improved means for mounting the shafts $q^3$ $r^3$ on the carrier-arms, so that they may be readily installed or removed when necessary to change the rolls of paper. To this end I have provided a bearing $i^4$ in each end of the carrier-arms to receive the shafts, and to secure the latter in place I have provided a cap $i^5$, having ears $i^6$, pivoted at $i^7$ to the carrier-arm. Said cap is held in position shown by a yoke $i^8$, pivoted at $i^9$ to the carrier-arm. Said yoke is provided with a set-screw $i^{10}$, which bears upon the outer end of the cap and holds the latter in position. The cap $i^5$ is provided with a lip $j^4$, which is adapted to be engaged by a latch $j^5$, pivoted at $j^6$ to the carrier-arm.

When the operator desires to remove a roll of paper, or vice versa, he places the arms in any convenient position (by means of the rotating devices) to dispose of the roll without manual effort—as, for instance, I may place a vehicle under the roll and manipulate the rotating devices so that I can deposit the roll thereon. I have shown in dotted lines, Fig. 8, the position of the cap $i^5$ when opened to release this shaft. It will be observed that the yoke $i^8$ has been swung out of contact with the cap and that the latter has been swung upwardly and engaged by the latch $j^5$ to hold it in its open position.

Proper frictional or tension devices (not shown) may be provided to regulate the winding of the paper on the shaft from the rolls as well as to control the unwinding from the roll from which the paper passes to the calendering-rolls.

I claim—

1. A calendering-machine comprising in its construction calendering-rolls, means for driving them at slow or fast speed, and means carried by one of said rolls for automatically disengaging the slow-speed mechanism when the fast-speed mechanism is engaged.

2. A calendering-machine comprising in its construction calendering-rolls, means for driving them at a comparatively slow speed during the introduction of paper to the rolls, fast-speed driving mechanism, and means carried by one of said rolls whereby the change to fast speed will automatically disconnect the slow-speed mechanism.

3. A calendering-machine comprising in its construction calendering-rolls, two shafts each having a pulley, clutch connections between the pulleys and the shafts, one of said shafts having means whereby speed communicated therefrom to the calendering-rolls will be reduced, and means for automatically disengaging the clutch mechanism of the last-mentioned shaft when the clutch of the other shaft is connected.

4. A calendering-machine comprising in its construction calendering-rolls, a shaft for operating said rolls, a driving-pulley on said shaft and having a clutch whereby said pulley may be employed to drive the shaft at high speed, a gear loosely mounted on said shaft and having a smaller gear or pinion meshing therewith, a shaft on which said smaller pinion is secured, a driving-pulley on the last-mentioned shaft, clutch mechanism between the last-mentioned pulley and shaft, means for automatically throwing out the last-mentioned clutch when the other is thrown in, and means for connecting the gear with the first-mentioned shaft when said gear is driven by the pinion.

5. A calendering-machine comprising in its construction calendering-rolls, means for driving them at slow or fast speed, means for automatically disengaging the slow-speed mechanism when the fast-speed mechanism is engaged, and a single controlling lever or arm movable in two directions for operating the power connections.

6. A calendering-machine comprising in its construction calendering-rolls, means for driving them at slow or fast speed, clutches for controlling the slow or fast speed driving means, two parallel clutch-operating shafts, a lever for oscillating one of said shafts, said lever being movable on the axis of said shaft and also in a direction at right angles thereto, and connections whereby the last-mentioned movement of the lever will be communicated to the other shaft.

7. A calendering-machine comprising in its construction calendering-rolls, means for driving them at slow or fast speed, clutches for controlling the slow and fast speed driving means, two parallel clutch-operating shafts, one of said shafts having a bevel-gear, a lever or arm secured to the other shaft to oscillate it, said lever being also pivotally connected with its support so as to be oscillated in a direction at right angles to the axis of the shaft, a tongue projecting from said lever, and a bevel-pinion meshing with the first-mentioned pinion and having a groove receiving said tongue.

8. A calendering-machine comprising in its construction calendering-rolls, means for driving them at slow or fast speed, clutches for controlling the slow or fast speed driving means, two parallel clutch-operating shafts, a lever for oscillating one of said shafts, said lever being movable on the axis of said shaft and also in a direction at right angles thereto, means whereby the last-mentioned movement of the lever will be communicated to the other shaft, and a guide-block for one end of said lever, the said block having an angular groove receiving said end of the lever.

9. A calendering-machine comprising in its construction calendering-rolls, a pulley connected with one of said rolls, means for driving the rolls at slow or fast speed, a shaft for supporting a roll on which the paper is wound, and a belt connecting the said pulley with a pulley on the said winding-shaft.

10. A calendering-machine comprising in its construction calendering-rolls, a shaft for driving said rolls and provided with a pulley, means for driving said shaft at slow or fast speed, movable arms for supporting the roll of paper to be calendered, means for holding said arms with their roll-carrying portions in either one of two different planes, a shaft and connections whereby it may rotate said roll when in one of its positions, and a belt connecting said pulley with a pulley on the paper-roll-driving shaft.

11. A calendering-machine comprising calendering-rolls, a movable carrier having arms for supporting the roll of paper to be calendered, means for oscillating said carrier, means for automatically interrupting said oscillation at a predetermined point, and means for locking said carrier at the end of each oscillation.

12. A calendering-machine comprising calendering-rolls, a pivotally-mounted carrier having roll-supporting arms arranged in pairs projecting in opposite directions from their axis of rotation, each pair of arms having means for supporting a roll of paper, means for oscillating said carrier, means for automatically interrupting said oscillation at a predetermined point, and means for locking said carrier at the end of each oscillation.

13. A calendering-machine comprising calendering-rolls, a paper-roll carrier having two pairs of pivotally-mounted roll-supporting arms projecting in opposite directions from their axis of rotation, each pair of said arms being provided with means for supporting a roll of paper, means for oscillating said carrier, and means for automatically interrupting said oscillation at a predetermined point.

14. A calendering-machine comprising calendering-rolls, movable arms for supporting the roll of paper to be calendered, means for oscillating said arms, means for automatically interrupting said oscillation at a predetermined point, means for holding said arms with their roll-carrying portions in either one of two different planes, and means for connecting power to and disconnecting it from a roll of paper supported by said arms.

15. A calendering-machine including calendering-rolls and having a paper-roll carrier comprising two pairs of rotatably-mounted roll-supporting arms projecting in opposite directions from their axis of rotation, each pair of arms having means for supporting a roll of paper, means for partially rotating the carrier and automatically stopping it at the end of such partial rotation, a power-operated shaft mounted in alinement with the axis of the supported roll in one of its stationary positions, and means for clutching said power-shaft to said roll.

16. A calendering-machine comprising calendering-rolls, rotatably mounted arms having means for supporting a roll of paper, means for oscillating said arms to bring them into convenient position for transferring a roll between said arms and a truck, and means for automatically interrupting said oscillation at a predetermined point.

17. A calendering-machine including calendering-rolls and having a paper-roll carrier comprising two pairs of rotatably-mounted roll-supporting arms projecting in opposite directions from their axis of rotation, each pair of arms having means for supporting a roll of paper, and means for reversing the direction of rotation of said arms, whereby a roll of paper may be conveniently transferred between a pair of said arms and a truck.

18. A calendering-machine comprising calendering-rolls, rotatable arms for supporting the roll of paper to be calendered, and means for oscillating said arms to bring them into convenient position for transferring a roll between said arms and a truck, said means comprising a gear on the axis of rotation of the arms, a shaft having a pinion meshing with said gear and having also a worm-wheel, a worm-shaft engaging said worm-wheel, and means for reversing the direction of rotation of said worm.

19. A calendering-machine comprising calendering-rolls, rotatably-mounted arms having means for supporting a roll of paper, a gear for operating said arms, said gear having some of its teeth omitted at diametrically opposite points, a shaft having a pinion meshing with the teeth of said gear, means for operating said pinion to rotate the gear until the blank space is reached, and means for locking the arms when the pinion is opposite either of the blank spaces of the gear.

In testimony whereof I have affixed my signature in presence of two witnesses.

CHARLES E. TORRANCE.

Witnesses:
    HORACE BROWN,
    A. W. HARRISON.